United States Patent [19]

Benteler et al.

[11] 4,325,268

[45] Apr. 20, 1982

[54] SAFETY STEERING COLUMN ASSEMBLY FOR AUTOMOBILES

[75] Inventors: Hubertus Benteler, Bielefeld; Rainer Hansen; Egon Olszewski, both of Paderborn-Elsen; Ferdinand Wecker, Paderborn-Sennelager, all of Fed. Rep. of Germany

[73] Assignee: Benteler-Werke AG, Paderborn, Fed. Rep. of Germany

[21] Appl. No.: 131,351

[22] Filed: Mar. 18, 1980

[30] Foreign Application Priority Data

Mar. 21, 1979 [DE] Fed. Rep. of Germany ....... 2911021

[51] Int. Cl.³ .............................................. B62D 1/18
[52] U.S. Cl. ..................................... 74/492; 188/371
[58] Field of Search .................. 74/492, 493; 188/1 C

[56] References Cited

U.S. PATENT DOCUMENTS

| 3,475,984 | 11/1969 | Ward | 74/492 |
| 3,911,759 | 10/1975 | Tanaka et al. | 74/492 |
| 4,050,326 | 9/1977 | Kopf | 74/492 |
| 4,194,411 | 3/1980 | Manabe et al. | 74/492 |

FOREIGN PATENT DOCUMENTS 2505340  8/1975  Fed. Rep. of Germany ........ 74/492

Primary Examiner—Allan D. Herrmann
Attorney, Agent, or Firm—Michael J. Striker

[57] ABSTRACT

A safety steering column assembly for automobiles comprising a steering shaft of variable axial length for connecting a steering wheel with a steering gear mechanism. A portion of the steering shaft adjacent the steering wheel is surrounded by a guide and support tube in which a bearing for turnably supporting the steering shaft is mounted. The guide and support tube, in turn, is surrounded by a corrugated tube serving as an impact absorber in which the corrugations of the tube are compressed into a block to reduce the axial length thereof. The stiffness of the corrugations of the corrugated tube varies along the length of the latter and the end of the corrugated tube distance from the steering wheel is fixedly attached to the guide and support tube, whereas the other end adjacent the steering wheel is releasably attached by means of a bracket to a portion of the body of the automobile so that upon impact on the steering wheel, for instance when during an accident the body of the driver hits the steering wheel, the corrugated tube is stressed in tension, whereby the compressed corrugations of different stiffness are gradually extended to provide a gradually increasing impact absorbing force.

12 Claims, 8 Drawing Figures

SAFETY STEERING COLUMN ASSEMBLY FOR AUTOMOBILES

BACKGROUND OF THE INVENTION

The present invention relates to a safety steering column assembly for automobiles, in which a steering shaft of variable length is provided for connecting a steering wheel with a steering gear mechanism in which the steering shaft is surrounded at a portion adjacent the steering wheel by a guide and support tube. The guide and support tube, in turn, is surrounded by a corrugated impact absorption tube, in which the stiffness of the corrugations varies along the length of the latter and in which the corrugated tube abuts with one end at a fixed point of the body of the automobile.

Such a safety steering column assembly is known in the art and for instance disclosed in the U.S. Pat. No. 4,050,326. In this construction the guide and support tube is connected over a member with a predetermined breaking point to the body of the automobile. The guide and support tube is surrounded between the member with the predetermined breaking point and the end of the guide and support tube distant from the steering wheel by a corrugated impact absorption tube, which abuts with its end distant from the steering wheel against the body of the automobile. The end of the impact absorption tube adjacent the steering wheel is only spaced a small distance from the member with the predetermined breaking point. A connection between the guide and support tube with the impact absorption tube is not provided.

The impact absorption tube has corrugations which are of different stiffness on different axial sections thereof. A plurality of groups of corrugations are provided between the ends of the impact absorption tube and in each groups the corrugations have the same radial extension. The radial extension increases, however, from one to the next group. The impact absorption tube is mounted in stretched condition in the assembly and is therefore loaded in compressing during an impact.

During impact of the driver on the steering wheel the deformability of the impact pot arranged adjacent the steering wheel is first used. If thereby not sufficient impact energy is absorbed, the end face of the impact pot will abut against one end of the guide and support tube tending thereby to move the latter in axial direction against the resistance of the member with the predetermined breaking point. If the latter also breaks, the impact absorption tube is compressed by means of a bracket connected in the region of the aforementioned member with the guide and support tube after a short resistant-free axial movement of the bracket. During this compression the guide and support tube serves to prevent a lateral movement of the impact absorption tube.

The above-described safety steering column, as disclosed in the U.S. Pat. No. 4,050,326, avoids various disadvantages of other known safety steering columns since due to the different radial extension of the corrugations, a progressive increase of the resistance provided by the impact absorption tube is obtainable. However, it has been shown during the compression of the impact absorption member first corrugations with the greatest radial extension are completely compressed to a block before the next corrugation are likewise compressed to a block. From this will result a force-displacement diagram of sawtooth-shaped configuration in which the largest amplitudes are provided by the compressed corrugations having the smallest radial extension. The resistance provided by the impact absorption tube is therefore very irregular.

Among the many suggestions for the construction of safety steering columns there is also known a safety steering column with a corrugated impact absorption member in form of a sleeve in which the walls of the corrugations are arranged closely adjacent to each other and in which the upper end of the sleeve facing the steering wheel is fixedly connected to a portion of the body of the vehicle. (U.S. Pat. No. 3,475,984)

In this construction the corrugated sleeve is stretched upon impact. This has the advantage that upon impact the corrugated sleeve is more or less symmetrically stretched, under maximum possible consumption of impact energy without danger of clamping on the steering column, and without requirement of additional means to prevent such clamping.

SUMMARY OF THE INVENTION

It is an object of the present invention to provide a safety steering column assembly with an impact absorption member in form of a corrugated tube and which is constructed to provide not only a progressively increasing resistance of the impact absorption member, but also a soft, substantially amplitude-free parabolic curve in a force displacement diagram.

With these and other objects in view, which will become apparent as the description proceeds, the safety steering column assembly of the present invention mainly comprises steering shaft means of variable axial length for connecting a steering wheel with a steering gear mechanism, a guide and support tube surrounding a portion of the steering shaft means in the region adjacent the steering wheel, impact absorption means comprising a corrugated tube, in which the corrugations are compressed to a block and in which the stiffness of the corrugations changes along the length of the corrugated tube, and in which the corrugated tube surrounds the guide and support tube and has an end distant from the steering wheel fixedly connected to the guide and support tube, and means for connecting the other end of the corrugated tube to a portion of the body of the automobile, so that said impact absorption means is stressed in tension upon impact of a force on the steering wheel.

The present invention starts from the recognition that in a corrugated impact absorption member which is stressed under tension all the corrugation will be stretched uniformly. This produces the advantage of a progressive increase of the resistance force, in which no amplitude variations depending on the corrugations will occur, as will result in corrugated impact-absorption members which are stressed in compression. Since the flanks of the corrugations are located closely adjacent to each other, only a small starting force is required. During increasing opening of the corrugation flanks the deforming force is continuously increased, because the corrugation flanks will become continuously flatter at increasing stress. The parabolic shape of the curve of the force-distance diagram becomes therefore smooth and uniformly increasing. By arrangement of differently shaped corrugations it is therefore possible to obtain any increasing curve shapes within wide impact force variations. In addition, due to the initial compression of the corrugations of the impact absorption member to a block, the advantage is obtained that the necessary mounting space of the impact absorption member is relatively small.

If, during impact of the driver on the steering wheel, the impact energy, which after a partial absorption thereof by an impact pot adjacent the steering wheel, is transmitted over the latter onto the guide and support tube, then the guide and support tube which is connected to the end of the impact absorption member applies a tension force to the latter. Thereby, the impact absorption member will produce first a small resistance by the corrugations of small stiffness, while at increasing elongation of the impact absorption member the resistance produced thereby will progressively increase.

According to an advantageous construction of the present invention, the end sections of the impact absorption member, that is the corrugated tube, are constructed as cylindrical sleeves, whereby the end sleeve distant from the steering wheel abuts against the guide and support tube and is welded to the latter, whereas the end sleeve adjacent to the steering wheel is releasably connected by a radially extending bracket to the body of the automobile and this sleeve surrounds a portion of the guide and support tube, which is in this region provided with a smaller diameter, with a certain clearance. The reduction of the diameter of the guide and support tube in this region corresponds approximately to the wall thickness of the latter. This diameter reduction determines thus the clearance between the end sleeve adjacent to the steering wheel and the guide and support tube. The corrugations of the corrugated tube preferably abut with inner portions thereof against the portion of the guide and support tube with the larger diameter, so that the guide and support tube prevents buckling of the corrugated tube.

In a preferred construction of the safety steering column assembly according to the present invention, the stiffness of the corrugations of the impact absorption means increases uniformly from one corrugation to the next, whereby the end of the corrugated tube having the corrugation with the smallest value of stiffness is welded to the end of the guide and support tube distant from the steering wheel, whereas the other end of the corrugated tube is connected to the body of the automobile.

A corrugated impact absorption tube which is advantageously used in the safety steering column assembly according to the present invention has corrugations of uniform wall thickness, which are at uniform distance from each other compressed to a block and in which the diameter of the corrugations increases from one to the next. Such an impact absorbing corrugated tube forms therefore a conical body of rotation which prevents a sudden extension of the tube under load, but provides a soft and progressively increasing resistance.

Such a deforming characteristic can, according to the present invention, also be obtained with an impact absorption member in which the corrugations are, with different distances from each other, compressed to a block so that the distance between successive corrugations increases from one to the next, whereby, however, the wall thickness and the diameters of the corrugations are kept the same throughout the length of the corrugated portion of the impact absorption member. In this case the different stiffness values over the length of the impact absorption member are obtained by the different distances of the corrugations from each other.

If the deformation shall start in the middle region of the impact absorption member or on both ends thereof, then such an impact absorption member is characterized according to the invention by corrugations which with a uniform distance from each other are compressed to a block, with the diameter of the corrugations increasing or decreasing from both cylindrical end sleeves and with uniform wall thickness of the corrugations. Such a construction will especially prevent buckling of the impact absorption member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
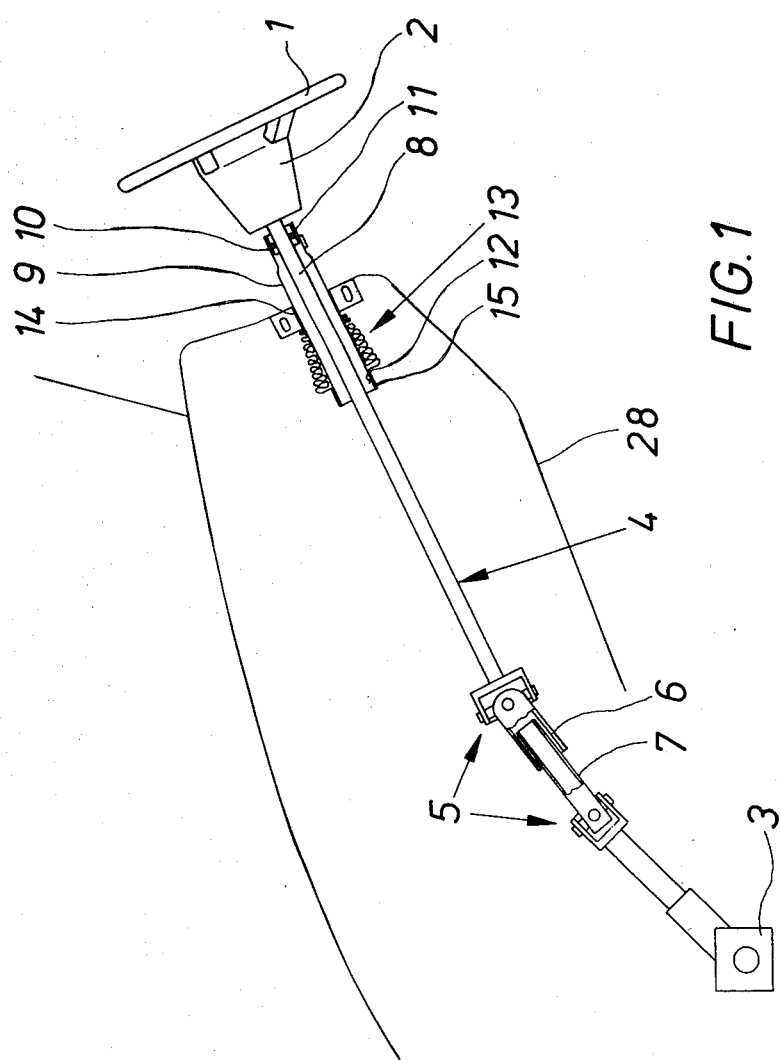
FIG. 1 is a schematic side view of the safety steering column assembly according to the present invention, partly in section.

Referring now to the drawing and more specifically to FIG. 1 of the same, it will be seen that the safety steering column assembly according to the present invention comprises a steering wheel 1 and an impact pot 2 of known construction connected thereto. A steering shaft 4, deflectable in transverse direction and adjustable in length, is arranged between the impact pot 2 and a steering gear 3. The transverse deflection of the steering shaft 4 is obtainable by a Cardan arrangement 5 and the length adjustment thereof by two coaxial telescoping sleeves 6 and 7.

Figure 2:
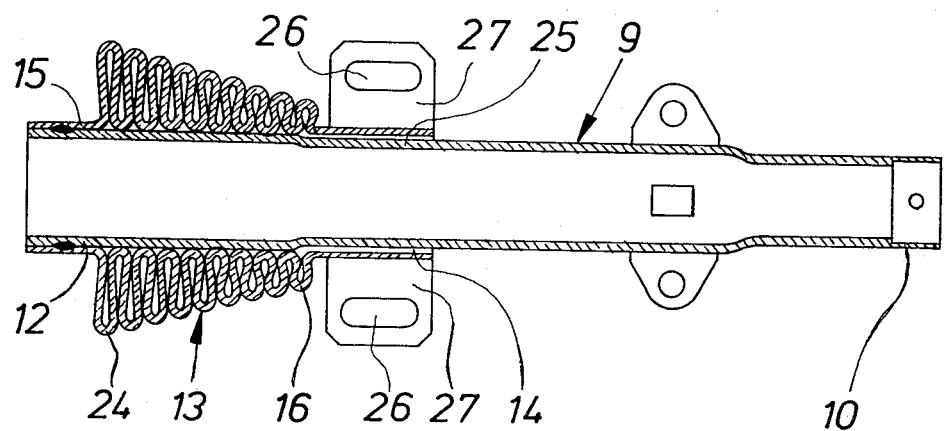
FIG. 2 is an axial cross section at an enlarged scale through an impact absorption member connected to a guide and support tube.

The upper portion 8 of the steering shaft 4, adjacent the steering wheel 1, passes with considerable play through an essentially cylindrical guide and support tube 9. At the end 10 of the guide and support tube 9, adjacent the impact pot 2, there is provided a bearing 11 for the steering shaft 4. The end of the guide and support tube 9 distant from the steering wheel 1 is surrounded by a corrugated impact absorption member 13 in which the corrugations are compressed to a block, as also shown in FIG. 2. The impact absorption member 13 is composed of two cylindrical end sleeves 14 and 15 and corrugations 16-24 between the end sleeves. As clearly shown in FIG. 2 the outer diameter of the corrugations increases uniformly from the end sleeve 14 to the end sleeve 15 from one corrugation to the next. The impact absorption member 13 has therefore over its length corrugations in which the adjacent corrugations have different stiffness, whereby evidently the corrugation 16 adjacent to the end sleeve 14 has the greatest stiffness, whereas the corrugation 24 adjacent the end sleeve 15 has the smallest stiffness.

As further clearly shown in FIG. 2, the end sleeve 15 of the impact absorption member 13 is welded to the end of the guide and support tube 9 which is distant from the steering wheel 2. The inner diameter of the end sleeve 15 corresponds substantially to the outer diameter of the guide and support tube 9 at the end 12 of the latter which is distant from the steering wheel 1. The individual corrugations 16-24 abut against the outer surface of the guide and support tube 9. In the region of the end sleeve 14, which is closer to the steering wheel than the end sleeve 15, the outer diameter of the guide and support tube 9 is reduced by a dimension which substantially corresponds to the wall thickness thereof, so that the end sleeve 14 surrounds the section 25 of the guide and support tube 9 with considerable clearance. Radially extending brackets 27, provided with elongated slots 26, are connected to the end sleeve 14, by means of which the impact absorption member and therewith indirectly also the guide and support tube 9 are connected to the body 28 of the automobile, as schematically shown in FIG. 1.

It is mentioned that in the construction as shown in FIGS. 1 and 2, the impact absorption member 13 has over its length a uniform wall thickness and the distance of any two adjacent corrugations is likewise the same.

Figure 3:
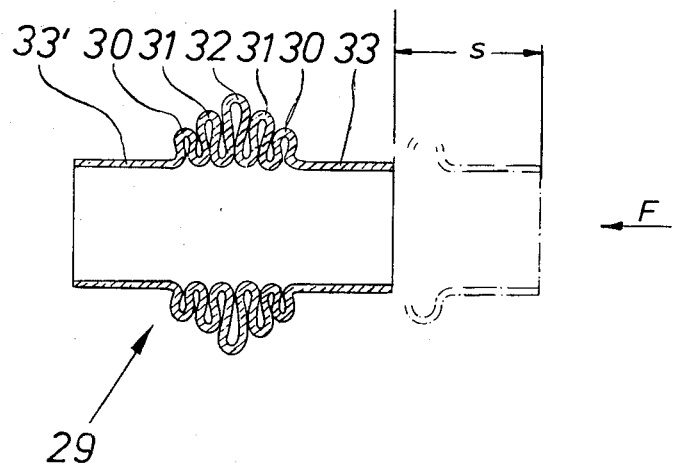
FIG. 3 is an axial cross section of a further embodiment of an impact absorption member compressed to a block.

FIG. 3 illustrates a second embodiment 29 of an impact absorption member according to the present invention. As can be seen from FIG. 3, the radial extension of the corrugations 30-32 increases from the two cylindrical end sleeves 33 and 33' in direction towards the middle of the impact absorption member 29. In this construction the wall thickness of the corrugations remains the same over the length of the impact absorption member 29. Likewise, the distance of any two adjacent corrugations remains the same. FIG. 3 shows in full line the corrugations compressed to a block, whereas the dash dotted line illustrates the noncompressed impact absorption member 29, which through a distance s under use of force F is compressed, before the impact absorption member 29 is assembled with the other elements of the safety steering column.

Figure 4:
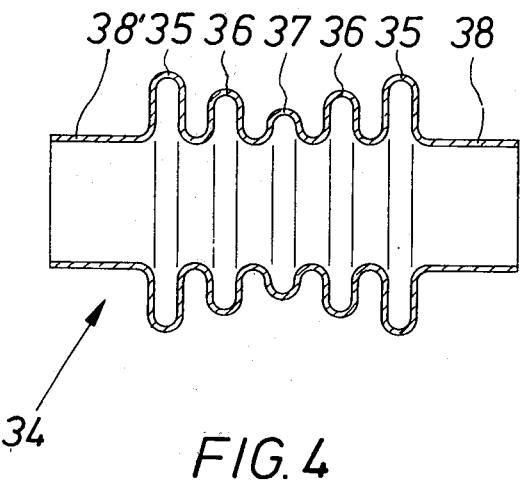
FIG. 4 is an axial cross section through a third embodiment of an impact absorption member before being compressed to a block.

FIG. 4 illustrates a third embodiment 34 of an impact absorption member, in which the outer diameters of the corrugations 35-37 decrease, starting from the cylindrical end sleeves 38 and 38', toward the middle of the impact absorption member 34. The wall thickness of the impact absorption member 34 is the same over the whole length thereof and so is the distance between adjacent corrugations 35, 36 or 36, 37. The impact absorption member 34 is shown in FIG. 4 in noncompressed condition, but it is to be understood that, before assembly with the other elements of the safety steering column, the impact absorption member 34 is compressed in longitudinal direction so that the flanks of the corrugations will abut against each other.

Figure 5:
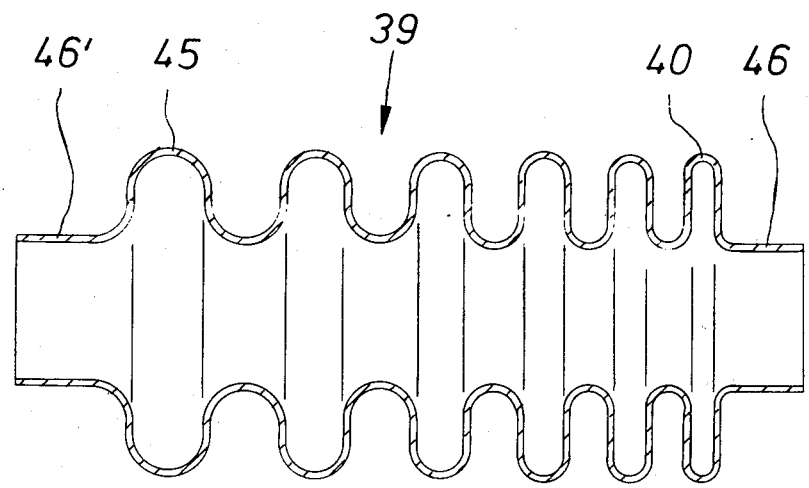
FIG. 5 is an axial cross section through a fourth embodiment of an impact absorption member also shown in non-compressed condition.

FIG. 5 illustrates an impact absorption member 39 in which the radial extension of the corrugations 40-45 is the same throughout the length of this impact absorption member. The wall thickness is likewise uniform over the whole length of the impact absorption member 39. However, as clearly shown in FIG. 5, the width of the corrugation and the distance of adjacent corrugations gradually increases from the end sleeve 46 to the end sleeve 46', so that in this way the member 39 is provided with corrugations the stiffness of which changes from one to the next. The impact absorption member 39 is likewise shown in FIG. 5 in noncompressed condition, but it is understood that, before assembly with the other elements, the impact absorption member 39 is compressed in axial direction so that the flanks of adjacent corrugation will engage each other.

Figure 6:
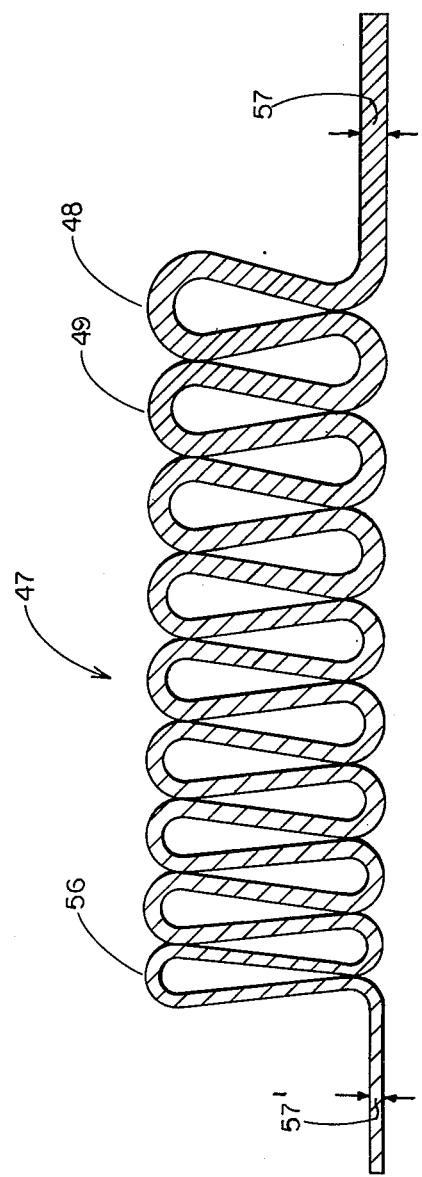
FIG. 6 is a fifth embodiment of an impact absorption member shown compressed to a block.

FIG. 6 partially illustrates a further embodiment of an impact absorption member according to the present invention. The impact absorption member 47 shown in FIG. 6 is illustrated in compressed condition, ready for mounting in the safety steering column assembly. As shown in FIG. 6 the corrugations 48-56 of the impact absorption member 47 have the same radial extension and the same distance from each other. However, the wall thickness of the corrugations gradually increases from the end sleeve 57 to the end sleeve 57'. It is pointed out that this increase of the wall thickness is exaggeratedly shown in FIG. 6, but in fact the actual difference of the wall thickness between the two end corrugations 48 and 56 is only a few tenths of a millimeter. The wall thickness of the end sleeve 57 and the corrugation adjacent thereto may for instance be 1 mm, whereas the wall thickness of the end sleeve 57' and the corrugation 56 adjacent thereto may for instance be 0.8 mm.

Figure 7:
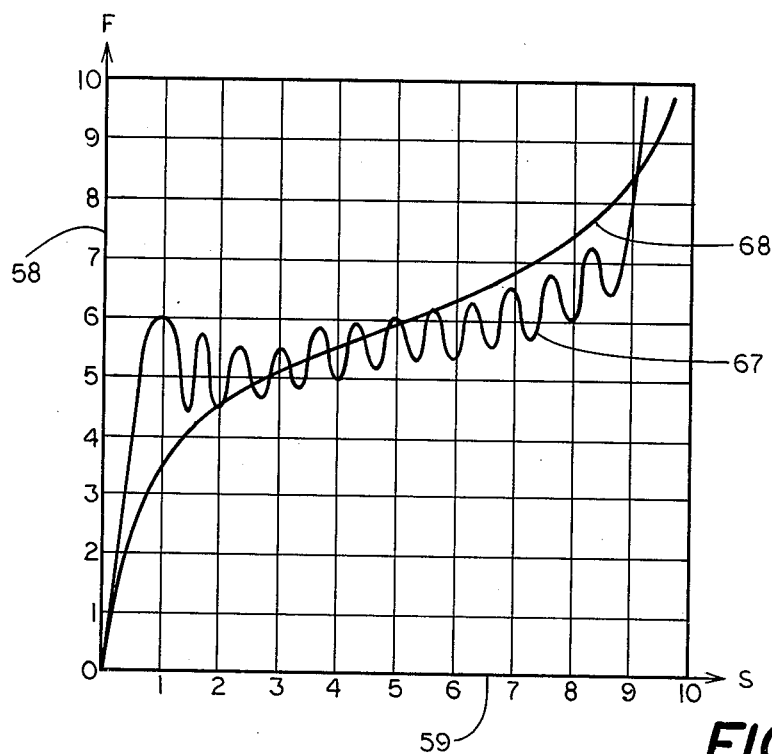
FIG. 7 is a force-displacement diagram.

FIG. 7 illustrates a force displacement diagram with a vertical force scale 58 and a horizontal displacement scale 59 for a corrugated impact absorption tube with corrugations of equal stiffness. The curve 67 illustrates the impact resisting force of such a corrugated tube which is subjected during the impact to compression. As clearly shown in FIG. 7, this curve has a series of adjacent amplitudes since during compression of the corrugated tube, the corrugations thereof are compressed one after the other. The curve 68, on the other hand, illustrates the resistant force of a corrugated tube with corrugations of equal stiffness which is stressed under tension. This curve does not show any amplitudes, however, the increase of the resistance force does not change in a uniform manner.

Figure 8:
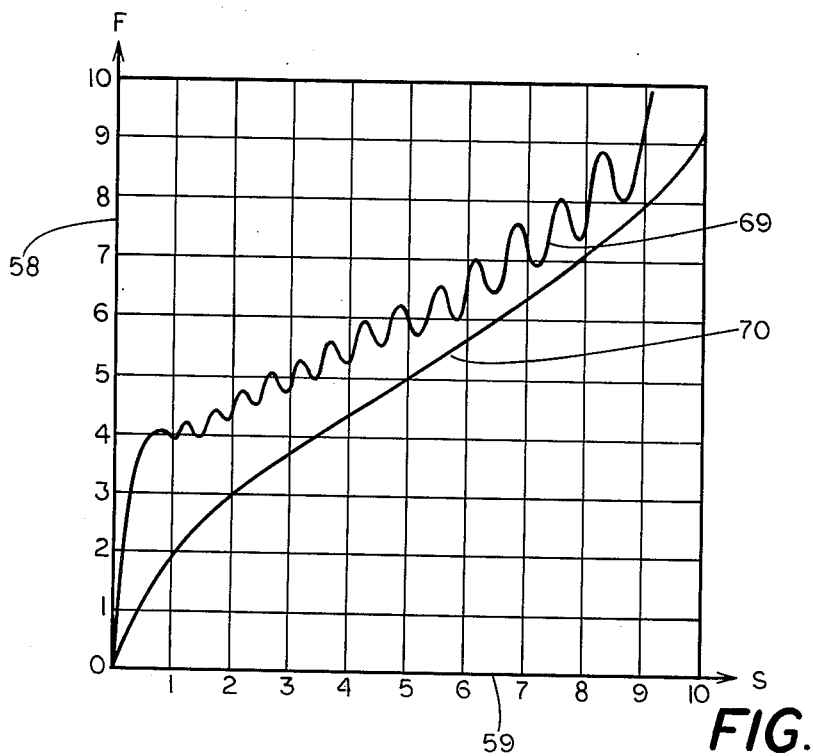
FIG. 8 is an additional force-displacement diagram.

FIG. 8 illustrates another force displacement diagram for corrugated impact absorption tubes having corrugations of different stiffness. The irregular curve 69 with a series of amplitudes illustrates the resistance force of such a corrugated tube which is subjected to compression, whereas the curve 70 illustrates the impact resistance force of a corrugated tube with corrugations of different stiffness in which the corrugations are compressed to a block as per the present invention and which is loaded under tension. As clearly evident from FIG. 8 the curve 70 increases very gradually and approaches nearly a straight line as the load increases.

The safety steering column according to the present invention will, as stated before, react as follows:

If during impact of the driver of the steering wheel 1, the impact energy, which after partial absorption thereof by the impact pot 2 adjacent the steering wheel, is transmitted over the pot 2 onto the guide portion 9, then the guide portion 9 which is connected to one end of the corrugated impact absorption member 13 applies a tension force to the latter. Since the stiffness of the corrugation changes along the length of the impact absorption member 13, this member will produce first a small resistance by the corrugation of small resistance, for instance the corrugation 24, shown in FIG. 2, while at increasing elongation of the impact absorption member 13 the resistance produced thereby will progressively increase very gradually as for instance shown at the curve 70 of FIG. 8.

It will be understood that each of the elements described above, or two or more together, may also find a useful application in other types of safety steering column assemblies differing from the types described above.

While the invention has been illustrated and described as embodied in a safety steering column assembly, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A safety steering column assembly for automobiles comprising steering shaft means of variable axial length for connecting a steering wheel with a steering gear mechanism; a guide and support tube surrounding a portion of the steering shaft means in a region adjacent the steering wheel; impact absorption means comprising a corrugated tube in which the corrugations are compressed to a block and in which the stiffness of the corrugation changes along the length of the corrugated tube, said corrugated tube surrounding a portion of the guide and support tube and having an end distant from the steering wheel fixedly connected to said guide and support tube; and means for connecting the other end of the corrugated tube to a portion of the body of the automobile, so that said impact absorption means is stressed in tension upon impact of a force on the steering wheel.

2. A safety steering column assembly as defined in claim 1, wherein said impact absorption means has a pair of end sections in form of cylindrical sleeves, the end section distant from the steering wheel has an inner diameter substantially equal to the outer diameter of said guide and support tube and is welded to the latter, and the means for connecting the other end section to a portion of the automobile body comprises a radially extending bracket for releasably connecting the other end section to a portion of the body, said guide and support tube having in the region of said other end section a portion of reduced diameter so that said other end section surrounds said portion with clearance.

3. A safety steering column assembly as defined in claim 1, wherein the stiffness of said corrugations uniformly increases from one to the other end of said corrugated tube and in which the end of the corrugated tube adjacent the corrugation with the smallest stiffness value is connected to the end of said guide and support tube which is distant from the steering wheel, whereas the other end of the corrugated tube is connected to the body of the automobile.

4. A safety steering column as defined in claim 1, wherein the corrugations of said corrugated tube are compressed to a block at uniform distance from each other, wherein all of the corrugations have the same wall thickness, but wherein the radial extension of successive corrugation changes along the length of the corrugated tube.

5. A safety steering column assembly as defined in claim 4, wherein the radial extension of successive corrugations changes from one to the next corrugation.

6. A safety steering column assembly as defined in claim 4, wherein the radial extensions of the corrugations increases from opposite ends of the corrugated tube towards the middle of the latter.

7. A safety steering column assembly as defined in claim 4, wherein the radial extension of the corrugations decreases from opposite ends of the corrugated tube toward the middle thereof.

8. A safety steering column assembly as defined in claim 1, wherein the corrugations of the corrugated tube are compressed to a block at nonuniform distance from each other and wherein all of the corrugations have the same wall thickness and the same radial extension.

9. A safety steering column assembly as defined in claim 1, wherein the corrugations of the corrugated tube are compressed to a block at a uniform distance from each other, wherein all corrugations have the same radial extension, but wherein the wall thickness of the corrugated tube gradually changes from one to the other end of the latter.

10. A safety steering column assembly as defined in claim 1, and including an impact pot between the steering wheel and the adjacent end of the steering shaft means.

11. A safety steering column as defined in claim 10, and including an antifriction bearing turnably supporting the steering shaft means in said guide and support 2.

12. A safety steering column as defined in claim 1, wherein said steering shaft means comprises a Cardan arrangement permitting lateral buckling of said steering shaft means.

* * * * *